(12) United States Patent
Garner et al.

(10) Patent No.: US 8,522,699 B2
(45) Date of Patent: *Sep. 3, 2013

(54) ROW UNIT FOR A SEEDING MACHINE

(75) Inventors: Elijah Garner, Bettendorf, IA (US); Michael E. Friestad, Rock Island, IL (US); Nathan A. Mariman, Geneseo, IL (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/571,526

(22) Filed: Aug. 10, 2012

(65) Prior Publication Data

US 2012/0298023 A1 Nov. 29, 2012

Related U.S. Application Data

(60) Continuation of application No. 13/352,914, filed on Jan. 18, 2012, now Pat. No. 8,276,529, which is a division of application No. 13/005,669, filed on Jan. 13, 2011, now abandoned, which is a division of application No. 12/363,968, filed on Feb. 2, 2009, now Pat. No. 7,918,168.

(51) Int. Cl.
*A01C 7/14* (2006.01)
*A01C 7/16* (2006.01)

(52) U.S. Cl.
USPC .................................................. 111/171

(58) Field of Classification Search
USPC ................... 111/170–172; 222/1, 160–173, 222/608–628, 251–415, 575; 239/1, 11, 239/650–688, 140, 146–176, 750, 568, 602; 198/804–853, 615, 617, 620, 622–637, 643, 198/644, 678.1, 860.1–861.6, 866, 950, 418–433, 198/570–613

See application file for complete search history.

(56) References Cited

U.S. PATENT DOCUMENTS

| | | | | |
|---|---|---|---|---|
| 2,960,258 | A * | 11/1960 | Dodwell | 221/93 |
| 6,024,033 | A * | 2/2000 | Kinkead et al. | 111/11 |
| 6,681,706 | B2 * | 1/2004 | Sauder et al. | 111/171 |
| 7,918,168 | B2 * | 4/2011 | Garner et al. | 111/171 |
| 8,276,529 | B2 * | 10/2012 | Garner et al. | 111/171 |

* cited by examiner

*Primary Examiner* — Christopher J Novosad

(57) ABSTRACT

A seeding machine row unit having a seed meter with an endless belt as a seed transport member. A pressure differential holds the seed onto the belt. The belt allows greater freedom in determining the location of the seed pick-up region and the seed release or removal region beyond the constraints of a fixed diameter seed disk. The row unit further includes a delivery system using a brush belt to move metered seed from the meter to the ground.

4 Claims, 16 Drawing Sheets

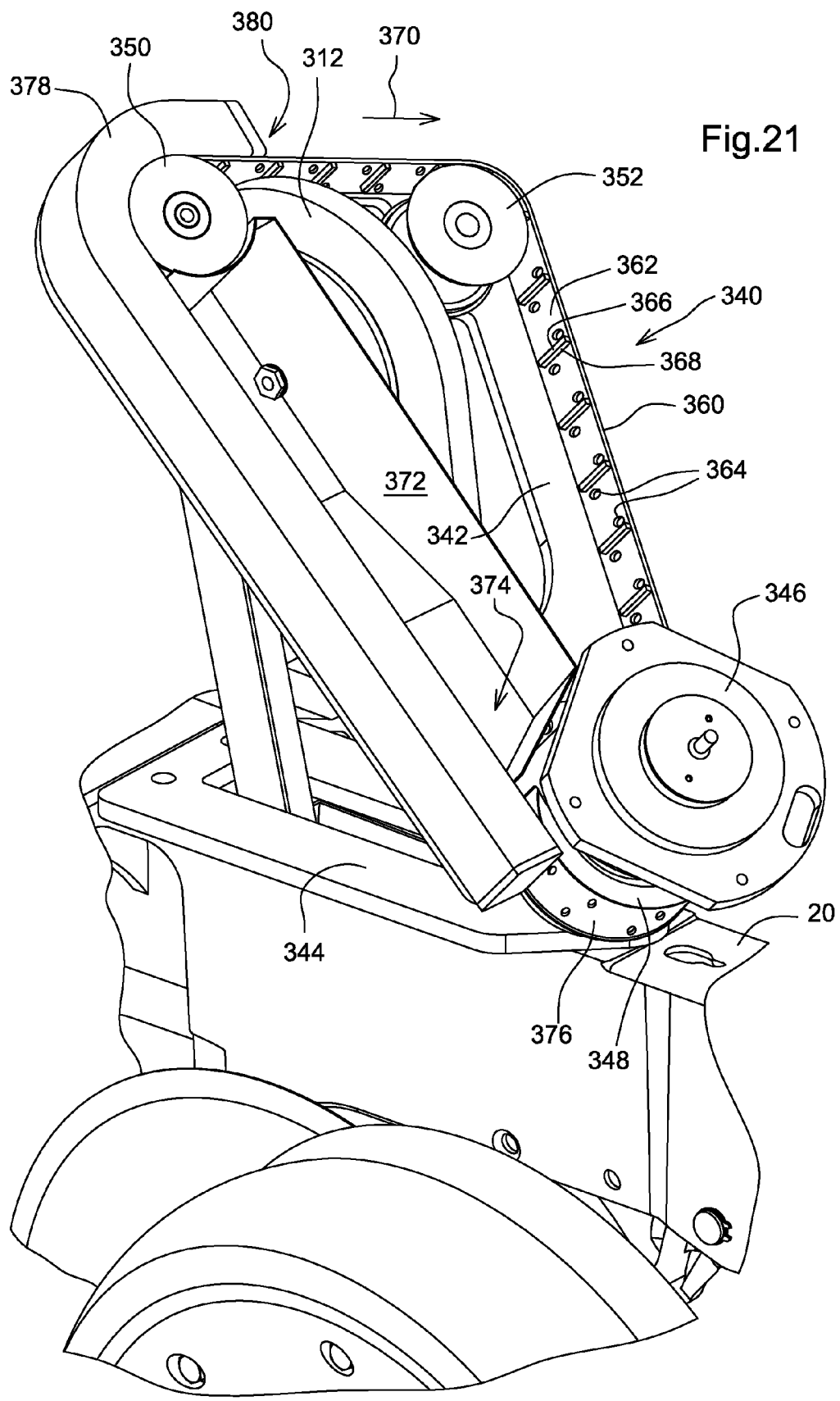

ROW UNIT FOR A SEEDING MACHINE

CROSS-REFERENCE TO RELATED APPLICATIONS

This application is a Continuation of application Ser. No. 13/352,914 filed Jan. 18, 2012, now U.S. Pat. No. 8,276,529, which is a Divisional of application Ser. No. 13/005,669, filed Jan. 13, 2011, abandoned, which is a Division of application Ser. No. 12/363,968, filed Feb. 2, 2009, now U.S. Pat. No. 7,918,168.

FIELD

The present disclosure relates to a row unit for a seeding machine having a seed meter with an endless belt seed transport member and a delivery system to move seed from the meter to the ground.

BACKGROUND

Farmers, like others, seek to increase their productivity. As farm sizes increase more work must be done in the same period of time. For example, the planting season on a farm extends over a fixed period of days. To increase the area farmed, the farmer must plant crops on the increased area in the same planting season or reduce crop yield. As a result, there is a need for planting equipment capable of covering more area per day. One approach to increase productivity is to increase the width of the planting equipment. However, there are physical limitations regarding the size of the equipment. Another approach is to increase the operating speed of the planting equipment.

One common form of planter utilizes a vacuum disk seed meter for each row unit of the planter. One example of such is shown in U.S. Pat. No. 5,170,909. There, a seed disk is rotated past a pool of seeds on one side thereof. A plurality of seed cells formed by recesses in the surface of the seed disk at one or more circumferential rows of holes adjacent the outer periphery of the seed disk mechanically accelerate and eventually capture therein individual seeds from the seed pool. The individual seeds are held within the cells by a pressure differential created by a vacuum source coupled to the inside of the housing on the opposite side of the seed disk until the cells reach a discharge area. At the discharge area, the effects of the vacuum are cut off so as to release the individual seeds from the cells for discharge through a chute at the bottom of the housing to a seed furrow below. To increase the planting speed with such a disk, the disk must rotate faster, which may adversely impact seed pick-up and singulation, or the diameter of the disk must be increased to deliver an increased number of seeds while rotating at the same number of revolutions per minute. Increasing the diameter of the disk raises the height of the seed discharge area, allowing the seeds to 'free fall' a greater distance. This adversely impacts seed placement accuracy.

Conveyor belts have also been used in planter row units as shown in U.S. Pat. No. 6,681,706. There the belt is not used to meter the seed but to convey the seed from the meter to a drop point. Belts have been used in grain drills as metering devices as shown in U.S. Pat. No. 6,581,535. The belt is equipped with a number of recesses which collect the seed and move the seed to a drop location. Such a belt functions as a volumetric meter that does not singulate seed to provide individual seeds.

SUMMARY

The present invention utilizes an endless belt as a seed metering and seed transport member together with a pressure differential to hold the seed onto the belt. The flexibility of the belt enables the spatial orientation of the belt to vary from location to location where different seed meter functions are performed. The belt allows greater freedom in determining the location of the seed pick-up region and the seed release region beyond the constraints of a fixed diameter metering disk. The flexibility in determining the location of the seed pickup region and the seed release region allows the meter to be configured to fit a variety of envelope constraints.

BRIEF DESCRIPTION OF THE DRAWINGS

FIG. 21 is a perspective view of another embodiment of the seed meter of the present invention.

DETAILED DESCRIPTION

Figure 1:
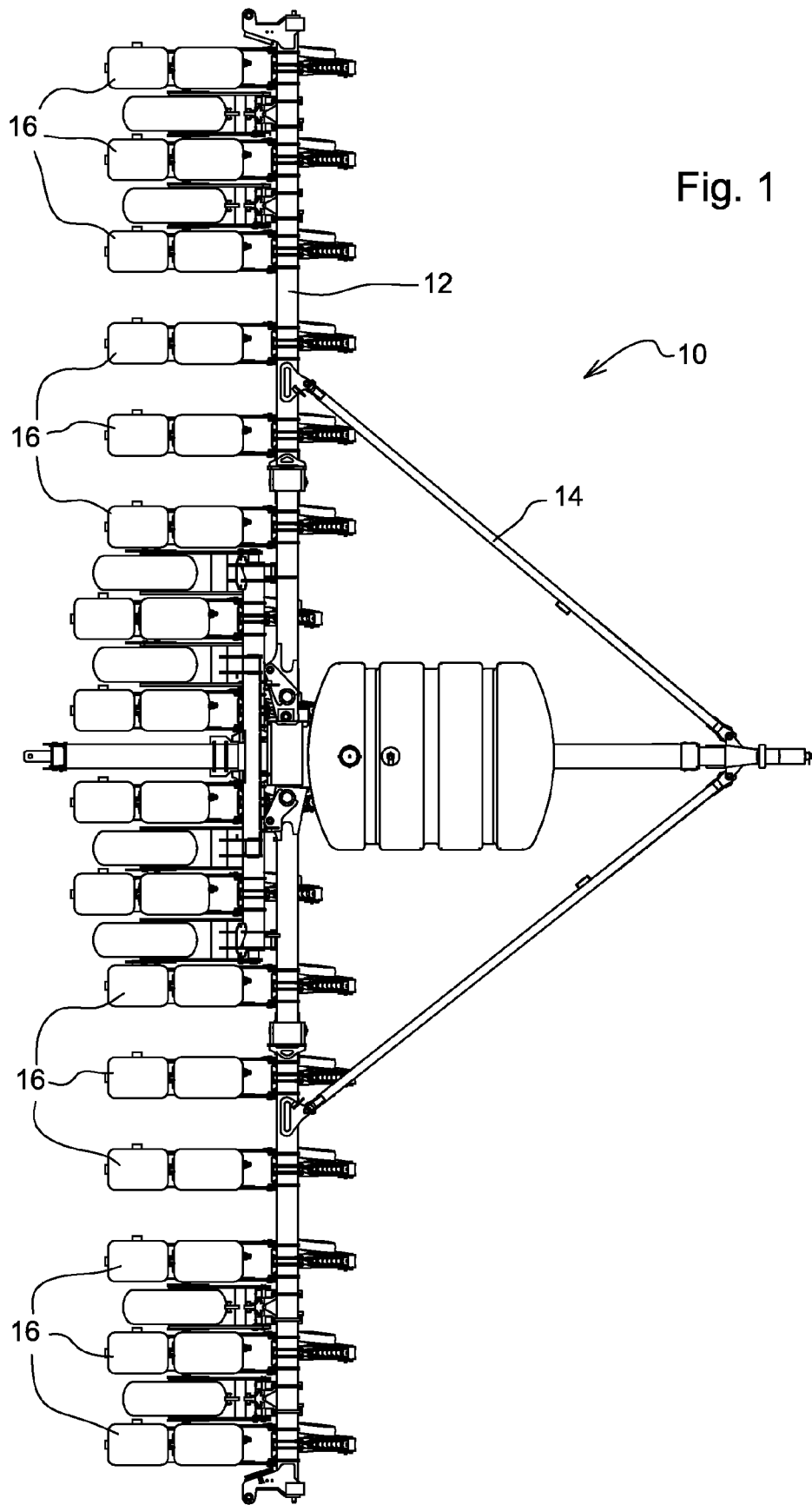
FIG. 1 is a plan view of a planter having the seed meter of the present invention.
Figure 2:
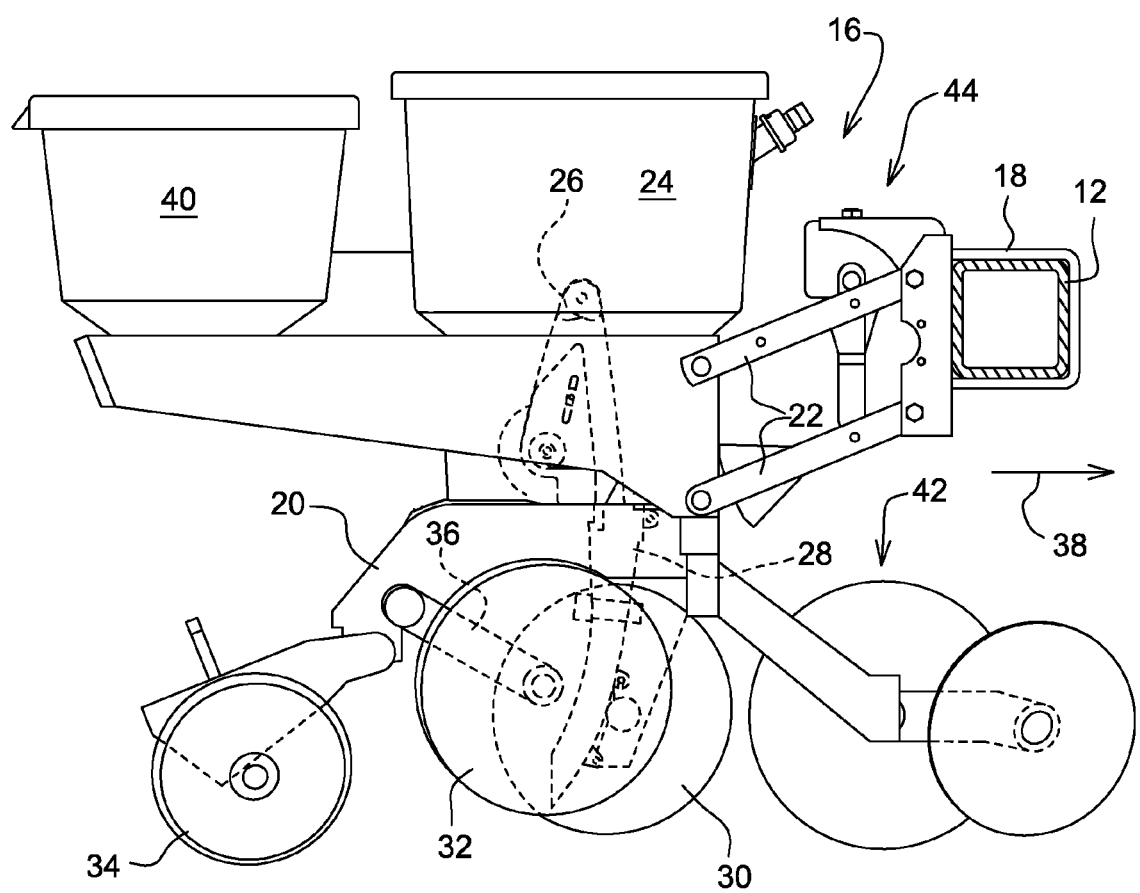
FIG. 2 is a side view of a row unit of the planter of FIG. 1.

With reference to FIG. 1 an example planter 10 is shown containing the differential pressure seed meter of the present invention. Planter 10 includes a tool bar 12 as part of a planter frame 14. Mounted to the tool bar are multiple planting row units 16. A row unit 16 is shown in greater detail in FIG. 2. The row unit 16 is mounted to the tool bar 12 in a conventional manner. The row unit 16 is provided with a central frame member 20 having a pair of upwardly extending arms 21

(FIG. 3) at the forward end thereof. The arms 21 connect to a parallelogram linkage 22 mounting the row unit 16 to the tool bar 12 for up and down relative movement between the unit 16 and toolbar 12 in a known manner. Seed is stored in seed hopper 24 and provided to seed meter 26. Seed meter 26 functions to select seeds individually and provide the seed to a placing mechanism, a seed tube 28 in FIG. 3 for delivery of the seed to a planting furrow formed in the soil by furrow openers 30. Gauge wheels 32 control the depth of the furrow and closing wheels 34 close the furrow over the seed. The gauge wheels 32 are mounted to the frame member 20 by arms 36. The toolbar and row unit are designed to be move over the ground in a forward working direction identified by the arrow 38.

The row unit 16 further includes a chemical hopper 40, a row cleaner attachment 42 and a down force generator 44. The row unit 16 is shown as an example of the environment in which the meter of the present invention is used. The present invention can be used in any of a variety of planting units.

Figure 3:
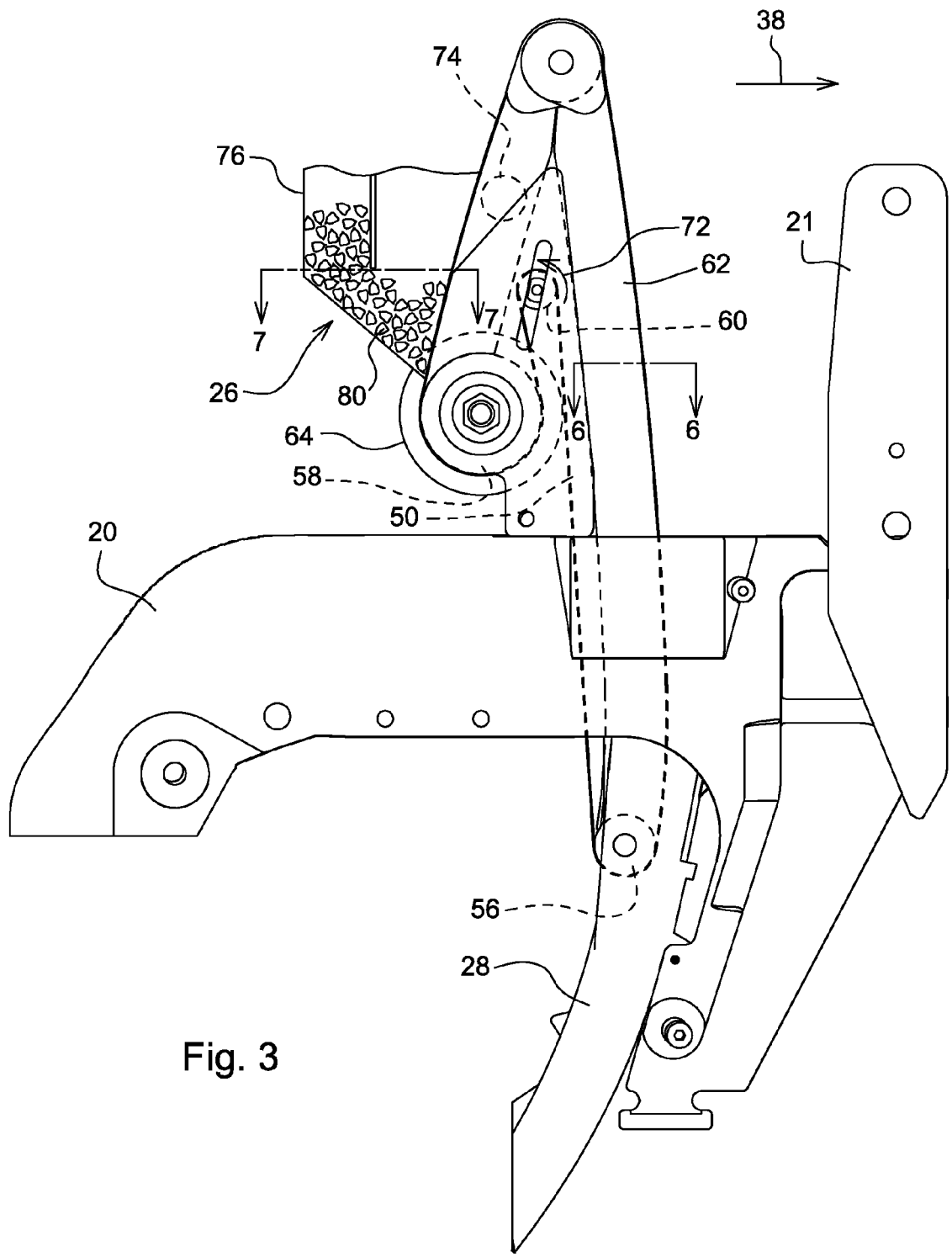
FIG. 3 is a side view of the meter of the present invention shown in relation to the row unit frame.
Figure 4:
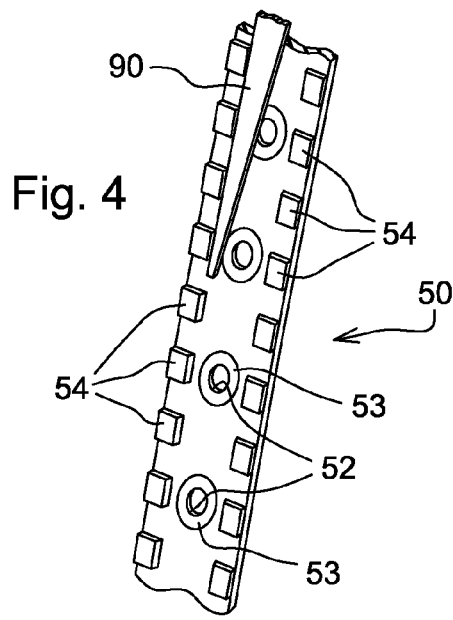
FIG. 4 is an enlarged perspective view of the seed pick-up region of the meter shown in FIG. 3.

One embodiment of the differential pressure seed meter 26 is shown in FIGS. 3-8. Excess structure from the row unit 16 has been omitted for purposes of clarity. A flexible seed transport member is provided in the form of an endless belt 50. The belt 50 has a series of apertures or perforations 52 along its length that extend through the belt from a seed side 55 shown in FIG. 4 to the opposite side 57. In FIG. 4, the belt is shown with optional recess 53 surrounding the apertures 52 forming seed cells. The seed cells may improve the pick-up and retention of certain seeds on the belt. The seed side of the belt also has a series of raised features 54 in the form of ribs along each edge of the belt. The raised features 54 each form a confronting face 59 in a travel direction 61 of the belt. The other surface of the belt is preferably flat in this embodiment. The belt 50 travels around idler pulley 56, a drive pulley 58 and is reverse wrapped around a tensioning idler pulley 60. The belt further travels over the outer surface of a vacuum manifold 62. The three pulleys and the vacuum manifold define the path of travel of the belt 50. The pulleys 56 and 60 are mounted to the row unit frame 20 by brackets (not shown) in a conventional manner. Tensioning idler pulley 60 is mounted on a pivot arm (not shown) that is biased to maintain tension in the belt 50. The pulley 58 is preferably driven by an electric motor 64. It will be understood, however, that mechanical, hydraulic, etc. drives for the seed meter 26 can be utilized. Additionally, any pulley in the system can be the drive pulley and any number of pulleys can be incorporated. The confronting faces 59 of the features 54 are used to agitate seed in the seed pool 80 and are optional.

Figure 5:
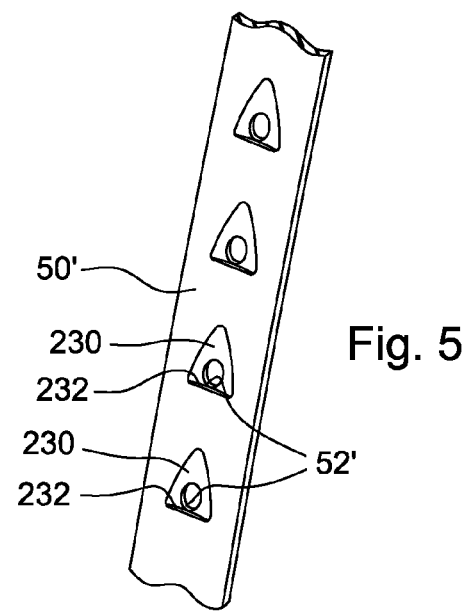
FIG. 5 is a perspective view of an alternative embodiment of the metering belt.

Another embodiment of the belt is shown in FIG. 5. There the belt 50' has apertures 52' each of which is surrounded by a feature 230 in the form of a recess which begins forward of the apertures 52' in the travel direction and cuts deeper into the seed side of the belt to the aperture and ends immediately after the aperture in an confronting face 232. The confronting faces agitate the seed and help to push the seed into a delivery system as described below.

Figure 6:
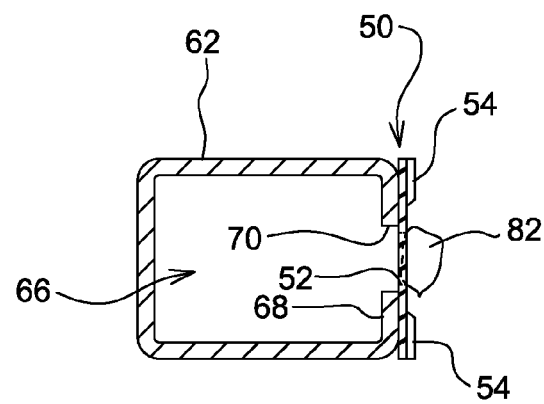
FIG. 6 is a sectional view of the vacuum manifold as seen from the line 6-6 of FIG. 3.

The vacuum manifold 62 is shown in section in FIG. 6. Manifold 62 has a hollow interior forming a vacuum chamber 66. The outer wall 68 of the manifold, over which the belt 50 slides, has a slot 70. As the belt travels, in the direction of the arrow 72, the apertures travel over the slot 70. This exposes the apertures to the internal pressure in the manifold chamber 66. The manifold further includes a vacuum port 74 through which the manifold chamber 66 is coupled to a the suction side of an air pump, not shown, but which are commonly employed in many modern planters.

Figure 7:
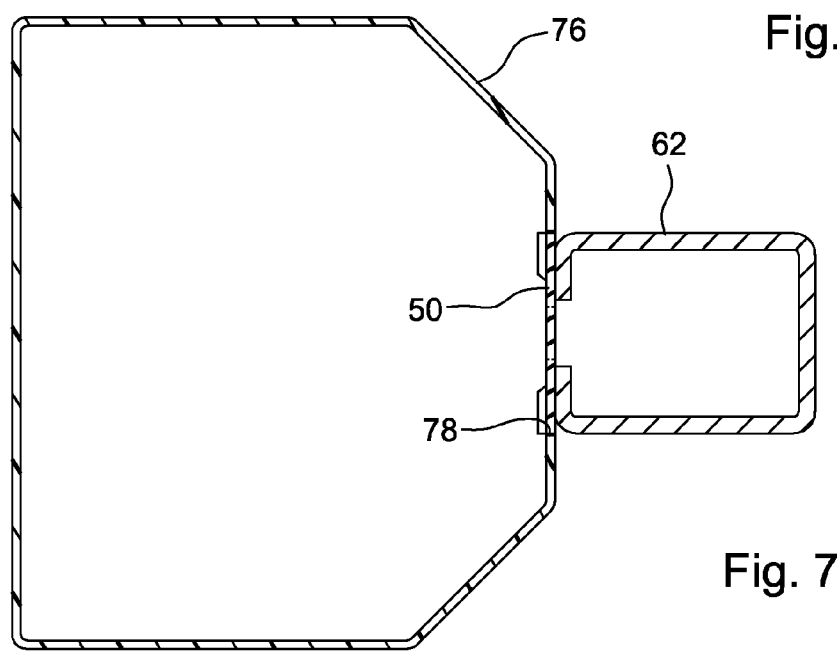
FIG. 7 is a sectional view of the of the seed hopper and meter in the seed pick-up region as seen from the line 7-7 of FIG. 3.

A lower portion 76 of the hopper 24 holds a pool of seed 80. Alternatively, a small hopper can be provided which receives and holds seed from a central, large seed tank. Hopper portion 76 is positioned immediately adjacent the belt 50 and has an opening 78 which fits over the belt 50 as shown in FIG. 7. The belt 50 closes the hopper opening 78, thereby exposing the belt 50 to the seed pool 80.

Figure 8:
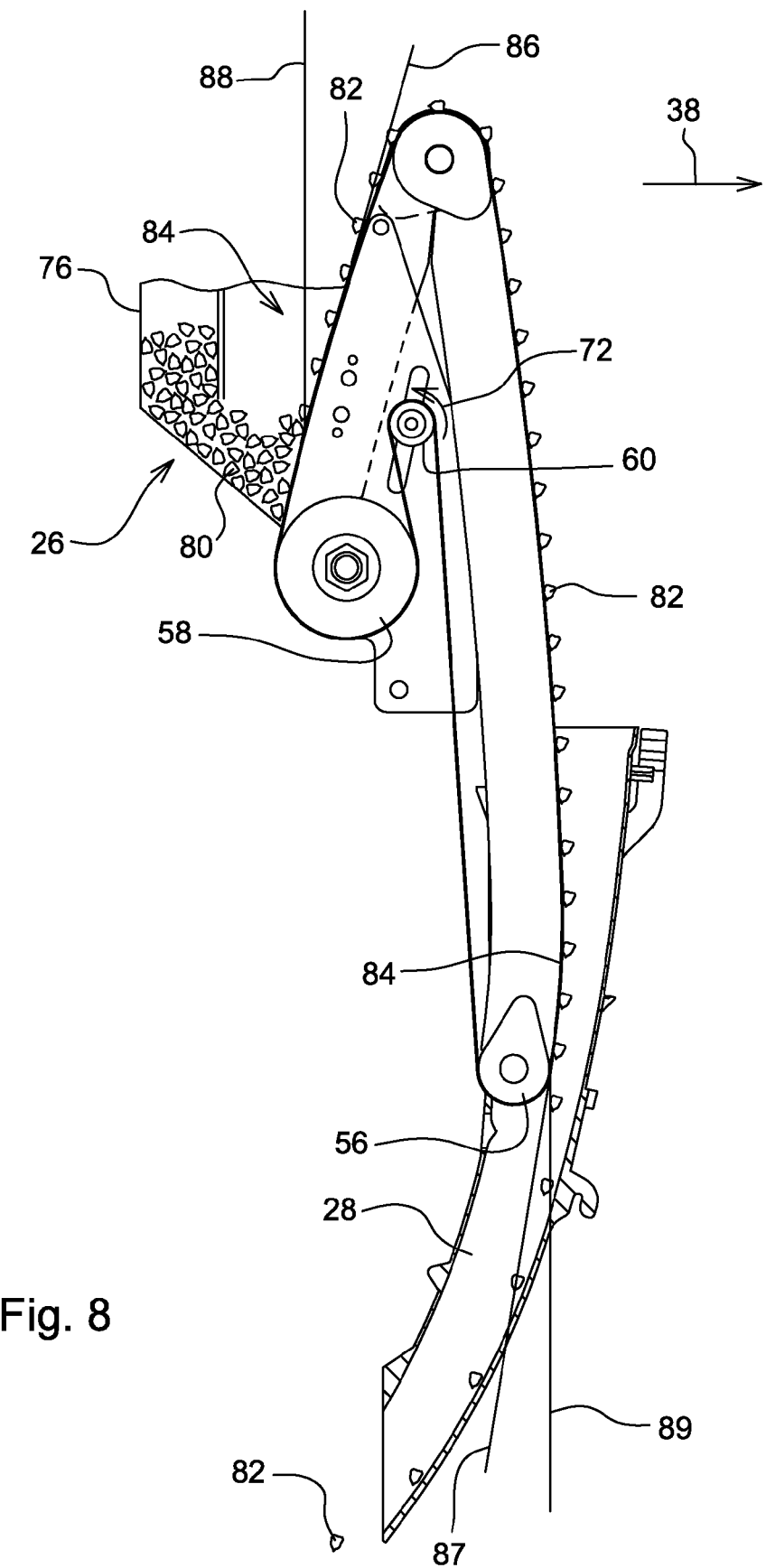
FIG. 8 is a side view of the meter like FIG. 3, illustrating the meter in operation.

In operation, as shown in FIG. 8, the vacuum pump produces a lower pressure in the manifold 62. The belt 50 is driven by the drive pulley 58 turning clockwise as viewed in FIG. 8. This moves the belt upward across the seed pool 80. The confronting faces 59 on the features 54 engage seed in the seed pool to agitate the seed. Air is drawn into the manifold through the apertures 52 in the belt which overlay the slot 70 in the manifold outer wall 68. As the belt moves through the seed pool, the air drawn into the manifold will draw seeds 82 onto each aperture 52 and the pressure differential across the belt apertures retains the seed thereon. The seeds 82 will then travel along the path of the belt 50 to a seed release region at the lower end 84 of the manifold where the pressure differential across the belt is terminated. The seeds 82 are then removed from the belt by gravity and fall off the belt into the seed tube 28, and from there into the furrow formed by the openers 30. The seed meter 26 may be configured with a housing over the belt 50 and positive pressure used to capture and retain the seed rather than the negative pressure of the vacuum manifold as described above.

In the hopper lower portion 76, a seed pick-up region 84 is defined where the belt passes the seed pool 80. This is where seeds are picked-up by the belt. In this seed pick-up region, the belt is in a plane 86 which may be angled relative to the vertical plane 88 as shown in FIG. 8. This is in contrast to a typical vacuum disk seed meter where the plane of the disk is vertical and thus the disk surface is vertical in the seed pick-up region. Furthermore, at the seed release region, the angle the belt plane is reversed relative to vertical as shown by the belt tangent plane 87 relative to the vertical plane 89. In this case, the belt is hanging over the seed and, as a result, when the seeds are released, the belt path moves away from the falling seed. This differs from a substantially vertical vacuum disk where the seeds are released at approximately the three O'clock position and fall across a portion of the vertical face of the disk upon release. The flexible seed transport member, belt 50, allows the spatial orientation of the transport member to be selected at various locations along its path to optimize the function of meter at each location. With a substantially vertically oriented vacuum disk, the orientation of the seed transport member remains at or near vertical at all locations and for all functions.

In the embodiment shown in FIGS. 3-8, the seed drop is located in the seed tube 28, at a location closer to the furrow than with a conventional vacuum disk. This reduces the length of seed free fall, allowing less drop time for variation to occur in the seed path and final seed spacing. The use of a belt for the seed transport member allows the designer the freedom to select the optimal seed drop location without the constraints of a fixed diameter seed disk. For example, if desired, the seed drop can be even lower in the seed tube than shown.

With reference again to FIG. 4, a wedge shaped plate 90 is provided just past the seed pick-up region. The plate 90 is positioned over the belt surface and functions to remove doubles or multiple seeds from the apertures 52 in the belt. Various configurations of the plate 90 can be used to remove doubles as are known in the field. Brushes, wheels or other fingered mechanisms can also be used.

Figure 9:
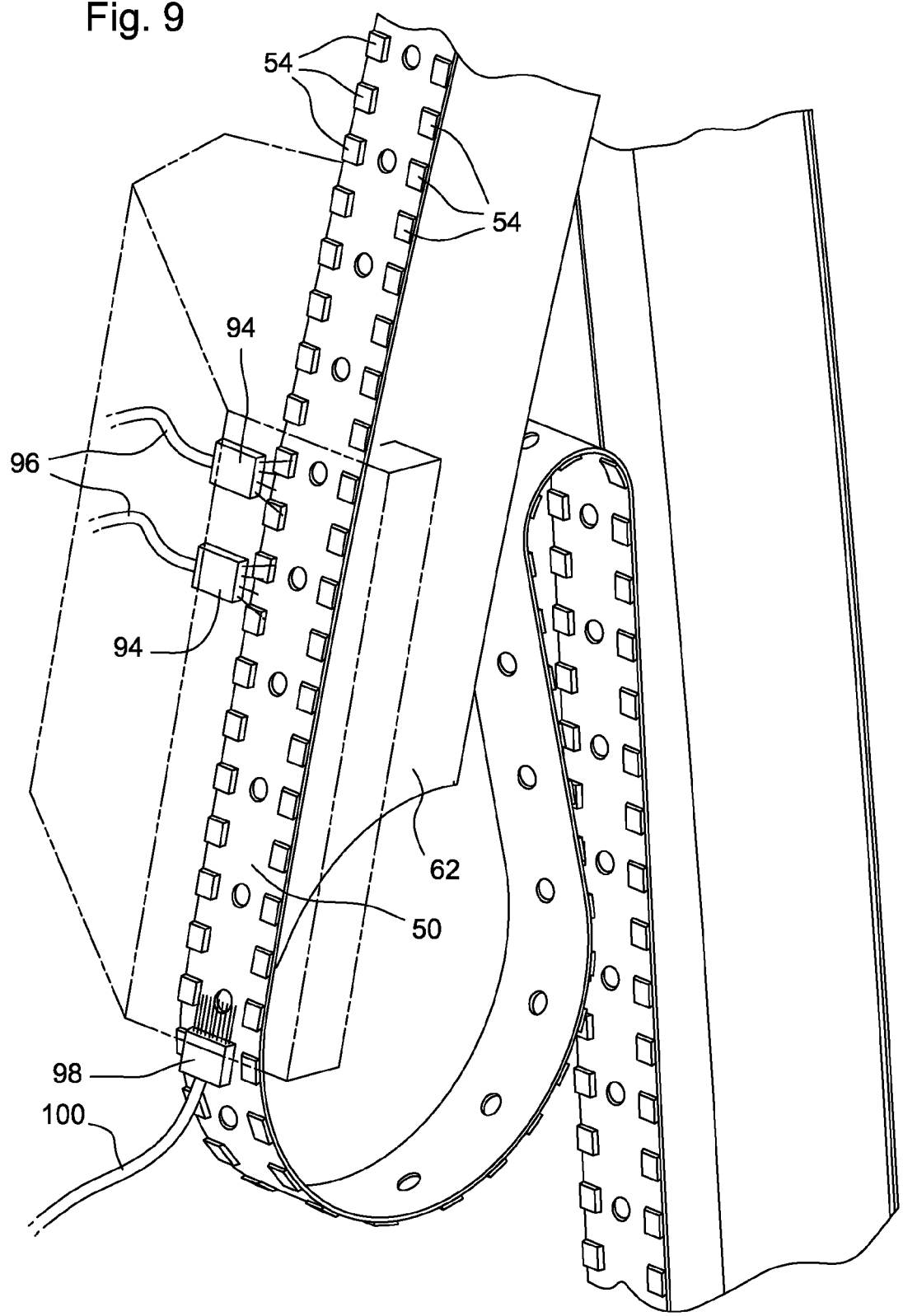
FIG. 9 is a perspective view of the meter and seed hopper showing an alternative seed singulator and agitator.

With reference to FIG. 9, as an alternative, the plate 90 is replaced with a pair of air nozzles 94. The nozzles are positioned to blow air across the belt 50 and dislodge multiple seeds. The seeds then drop back into the seed pool 80. The nozzles are coupled by tubes 96 to the exhaust side of the air pump used to provide the vacuum in the manifold 62. A separate air compressor could be used if desired to produce the air blast. Agitation of the seed pool 80 can also be accomplished by pressurized air. A nozzle 98 is provided in the hopper lower portion 76, below the seed pick-up region. The air from the nozzle 98 is directed into the seed pool, causing the seeds to circulate within the seed pool rather than remain packed together. The air causes the seeds to move across the surface of the belt, assisting in capture of seeds in the apertures 52. The nozzle 98 is also coupled to the air pump exhaust by tube 100 or to a separate air compressor or to an incoming positive air pressure inlet in the case of a positive air pressure system. Pressurized air to remove doubles and to agitate the seed pool can be used in seed meters having seed transport members other than the metering belt shown here, such as, but not limited to, a vacuum seed disk.

Figure 10:
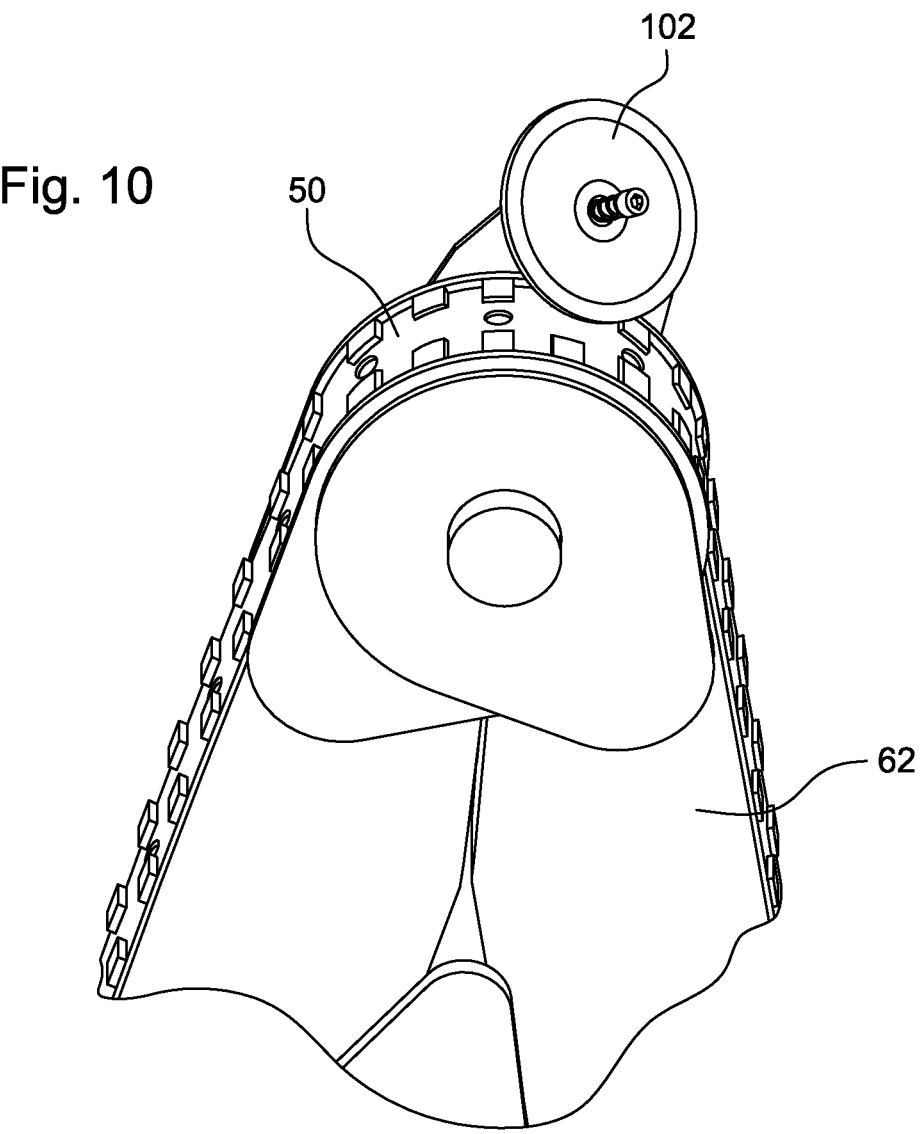
FIG. 10 is a perspective view of an alternative seed singulator.

With reference to FIG. 10, a roller singulator 102 is shown in position contacting the surface of the belt 50 near the apertures 52. As the seeds pass the roller, if multiple seeds are adhered to the belt at a given aperture, the roller gently removes the excess seeds.

Figure 11:
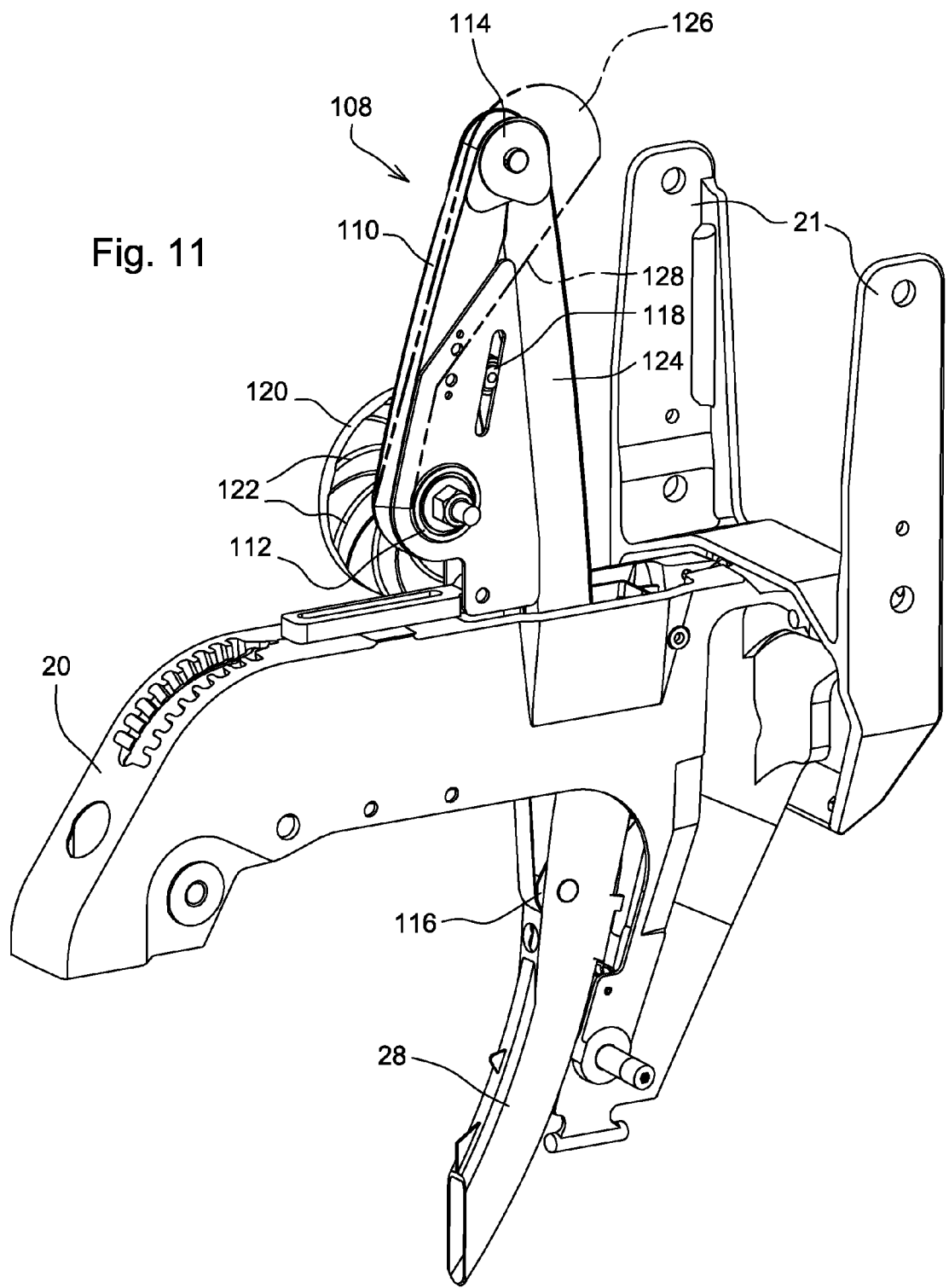
FIG. 11 is a perspective view of an alternative embodiment of the meter of the present invention.

FIG. 11 shows another embodiment of the differential pressure seed meter with a belt 110 of similar construction as belt 50. The belt 110 is wrapped about a drive pulley 112, idler pulleys 114 and 116 and reverse wrapped around the tensioning idler 118. The drive pulley is provided with a flange 120 having raised features 122 to agitate the seed in the seed pool. A manifold 124 provides the vacuum pressure differential to the belt 110. The idler pulley 114 is slotted to maintain vacuum to the belt as it travels over the pulley 114. The pulley 114 has a small diameter such that during operation, the centrifugal force on the seeds traveling around the pulley 114 will cause excess seed to be thrown off the belt 110, thereby automatically singulating the seed. The housing 126 surrounding the pulley 114 catches the thrown seed and includes a slide 128 which returns the thrown seed to the seed pool.

Figure 12:
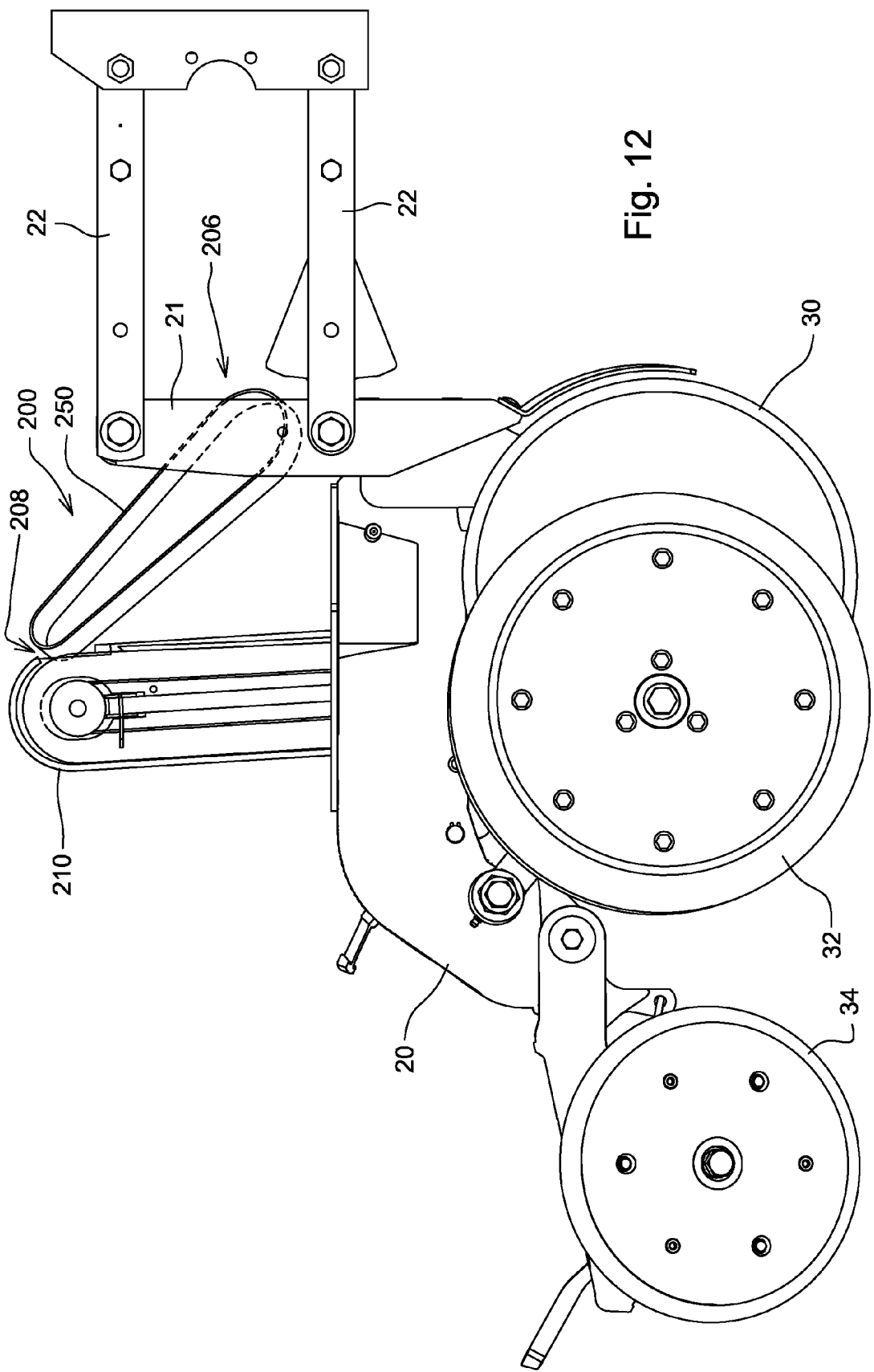
FIG. 12 is a schematic side view of another arrangement of the meter of the present invention shown in a planter row unit together with a seed delivery system to move the seed from the meter to the ground.

The meters shown in FIGS. 3 and 11 can be designed to fit within the packaging space for the seed meter of many current John Deere production planter row units. The belts operate in a generally vertical plane that is oriented in the fore and aft travel direction of the row unit. However, other arrangements of the meter are possible. For example, with reference to FIG. 1, a belt meter 200 is shown schematically to illustrate the relationship of the belt 250 relative to the row unit structure. The belt 250 lies in a plane that is inclined relative to all three axes, that is the plane of the belt is inclined relative to a vertical fore and aft plane, inclined relative to a vertical transverse plane and inclined relative to a horizontal plane. Furthermore, the seed pickup region 206 is positioned at the lower end of the belt 250 while the seed release location 208 is located at the upper end of the belt 250. In the embodiment shown in FIG. 12, the seed is removed from the belt 250 at the release location by a seed delivery mechanism 210. The seed delivery mechanism is fully described in co-pending application Ser. No. 12/364,010 filed Feb. 2, 2009 and incorporated herein by reference. The seed delivery mechanism 210 moves the seed from the seed meter belt to the lower end of the row unit between the furrow opening disks 30 where it is deposited into the furrow formed in the soil. The seed meter 200 is similar to the seed meter 26 described above and is described fully below with reference to FIGS. 13-20.

The seed meter 200 has a frame member 220 in the form of a plate which is mounted to the row unit frame 20 in a suitable manner. The frame member 220 supports the upper idler pulley 256 and the lower drive pulley 260 about which the belt 250 is wrapped. A gearbox and drive motor (not shown) are coupled to the shaft 264 to drive the pulley 260 and belt counterclockwise as viewed in FIG. 13 and shown by the arrow 261. The frame member 220 also carries a vacuum manifold 262 having a hollow interior vacuum chamber 266. A vacuum port 263 extends from the opposite side of the vacuum chamber through the frame member 220. The manifold 262 has an outer wall 268 (FIG. 15) containing a main slot 270 extending the length of the outer wall. A secondary slot 272 extends only a short portion of the length of the outer wall.

The belt 250 has an outer seed engaging face or side 251. The belt 250 includes a row of first apertures 252 which overlie the slot 270 in the manifold 262. The apertures 252 extend through the belt, allowing air to flow through the belt. The belt further has a plurality of features 254 formed as ribs extending from the seed face 251. The features 254 each for a confronting face 255 shown in FIG. 19 facing in the travel direction of the belt. In this embodiment, the feature 254 confronting face 255 extend outward from the seed side 251 of the belt. In the embodiment shown, the features 254 do not extend laterally to both side edges of the belt, but leaves a flat edge zone 257 along one edge of the belt. An optional second row of apertures 258 in the belt are positioned to pass over the secondary slot 272 in the manifold outer wall 268. The apertures 258 are only in communication with the vacuum chamber 266 for the short portion of the path of the apertures 258 over the slot 272.

A housing 276 is attached to the frame member 220 and closely positioned to the belt 250. A portion 277 of the housing 276 overlies the flat edge zone 257 of the belt. The housing 276, the belt 250, and a cover 278 (shown in FIG. 18) form a small chamber 279 which holds a pool of seed 280. A brush 282 mounted to the housing 276 sweeps across the face 251 of the belt and seals the chamber 279 at the location where the belt enters the chamber to prevent seed from escaping the chamber 279. Seed enters in the chamber 279 through a suitable port, not shown, in the housing 276 or housing cover 278.

The belt 250 and housing 276 form a V-shaped trough for the seed pool that extends uphill in the direction of belt travel. The confronting faces 255 formed by the features 254 of the belt engage the seed in the pool to agitate the seed creating a circular flow of seed as shown by the broken line 284 of FIG. 14. Since the belt forms one side of the V-shaped trough, seed will always remain in contact with the belt regardless of tilt or inclination of the planter, as long as sufficient seed is present in the seed pool. An advantage of the seed meter is that when the vacuum shut off, seed on the belt falls back into the seed pool. This is in contrast to disk meters where a portion of the seed on the disk above the seed tube will fall to the ground upon vacuum shut-off.

Figure 16:
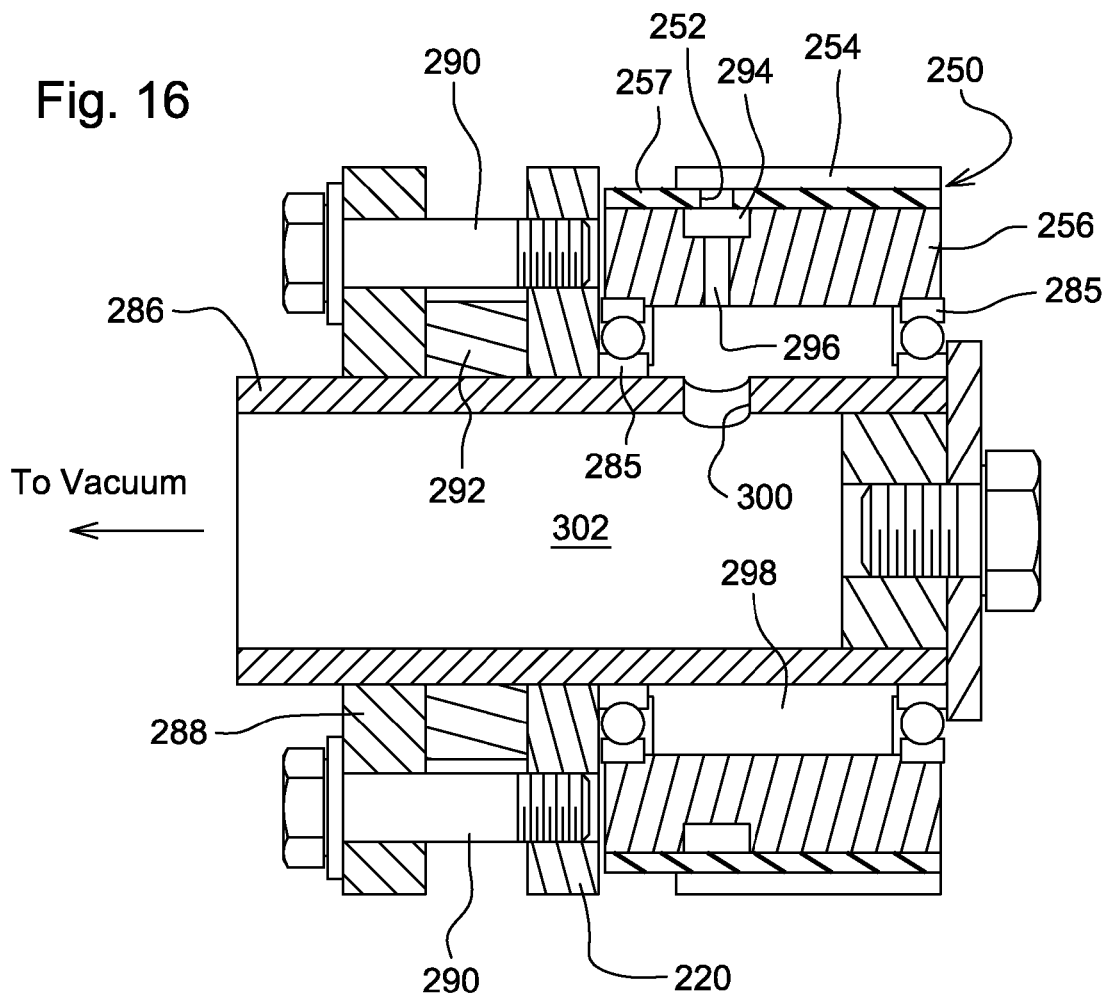
FIG. 16 is a sectional view of the idler pulley mounting structure of the seed meter of FIG. 13.
Figure 17:
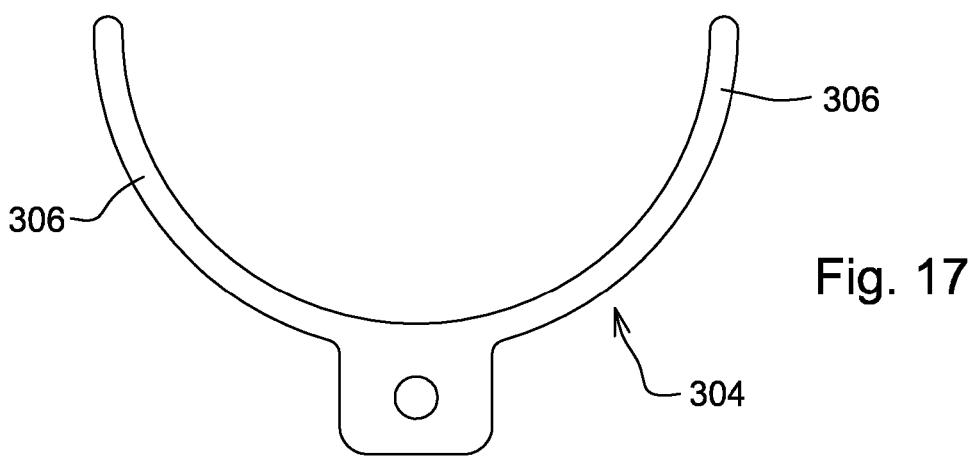
FIG. 17 is a plan view of a vacuum control member in the seed meter of FIG. 13.
Figure 18:
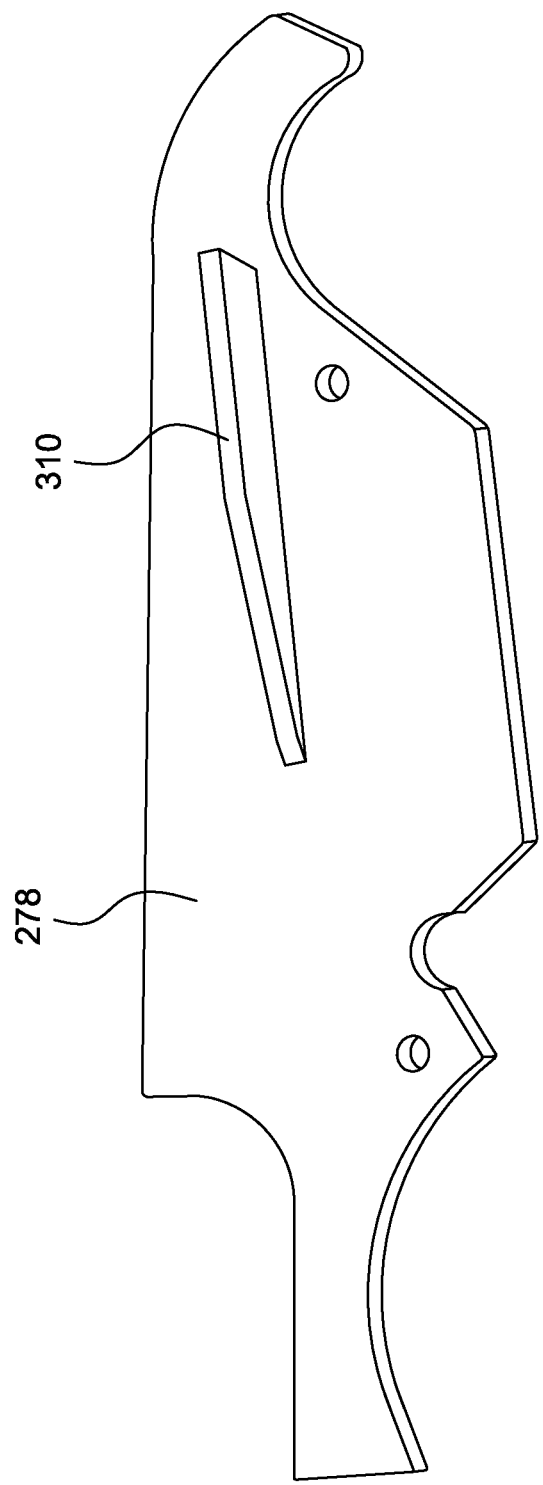
FIG. 18 is a perspective view of the seed meter housing cover of the seed meter of FIG. 13.

The idler pulley 256 is supported by a bearing set 285 on a tube 286 (FIG. 16). A flange 288 welded to the tube 286 is attached to the frame member 220 by bolts 290. A spacer 292 is positioned between the flange and frame member 220. The idler pulley 256 has a groove 294 in its outer periphery which is in line with the belt apertures 252. Channels 296 extend radially through the pulley 256 to an annular chamber 298 surrounding the tube 286. An opening 300 in the tube 286 provides communication between the chamber 298 and the hollow interior 302 of the tube. The tube is connected to the vacuum source whereby the vacuum is applied to the apertures 252 in the belt as the belt travels over the pulley 256. A fork 304 is attached to the frame member 220 with tines 306 seated in the groove 294 in the idler pulley. The tines filled the groove 294 to cut off the vacuum and create the seed release location 208. The tines 306 extend from the seed release location to the vacuum manifold in the direction of rotation of the idler pulley to seal the vacuum chamber and the groove in the idler pulley.

Figure 19:
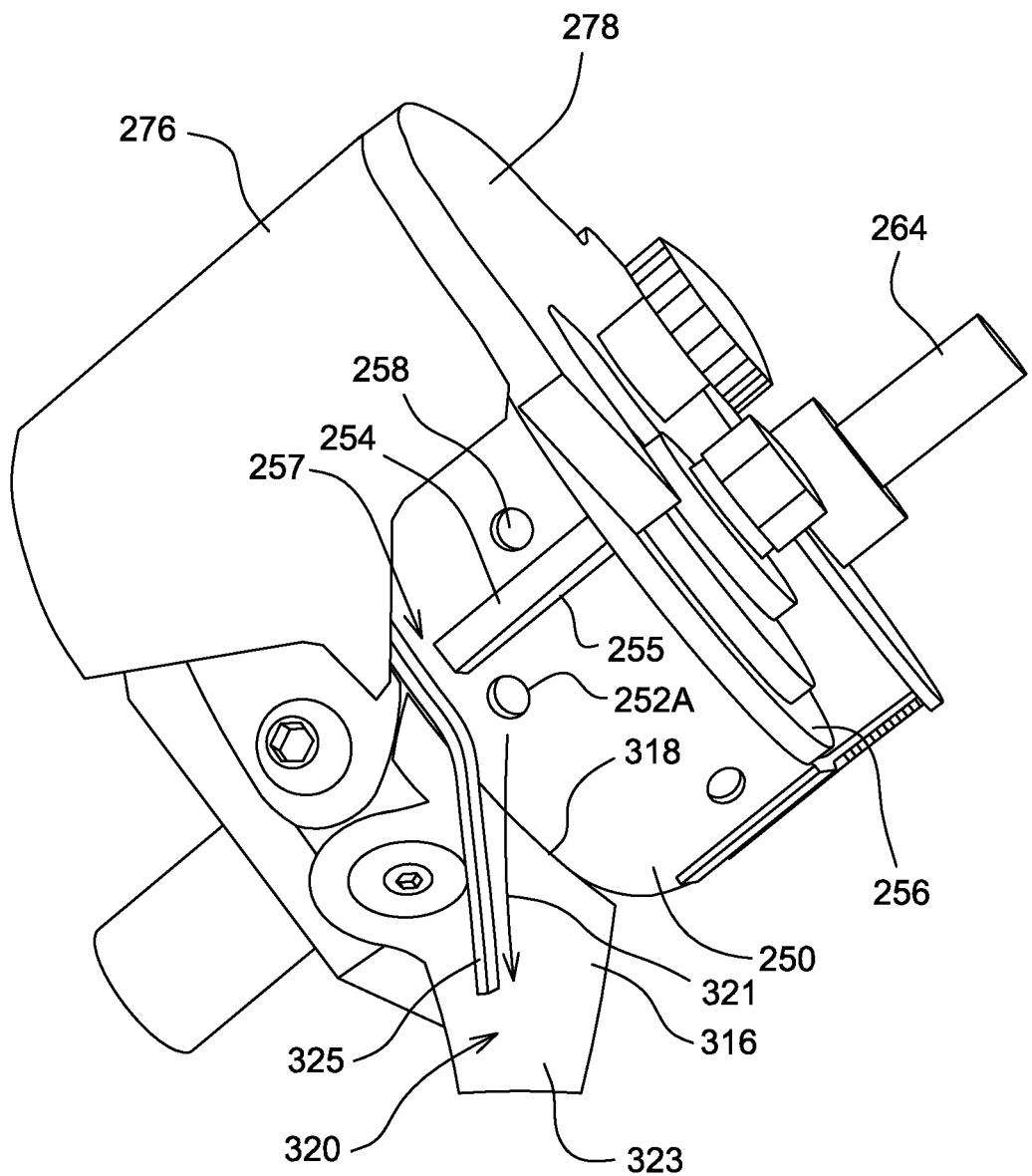
FIG. 19 is perspective view of the upper end of the seed meter of FIG. 13.
Figure 20:
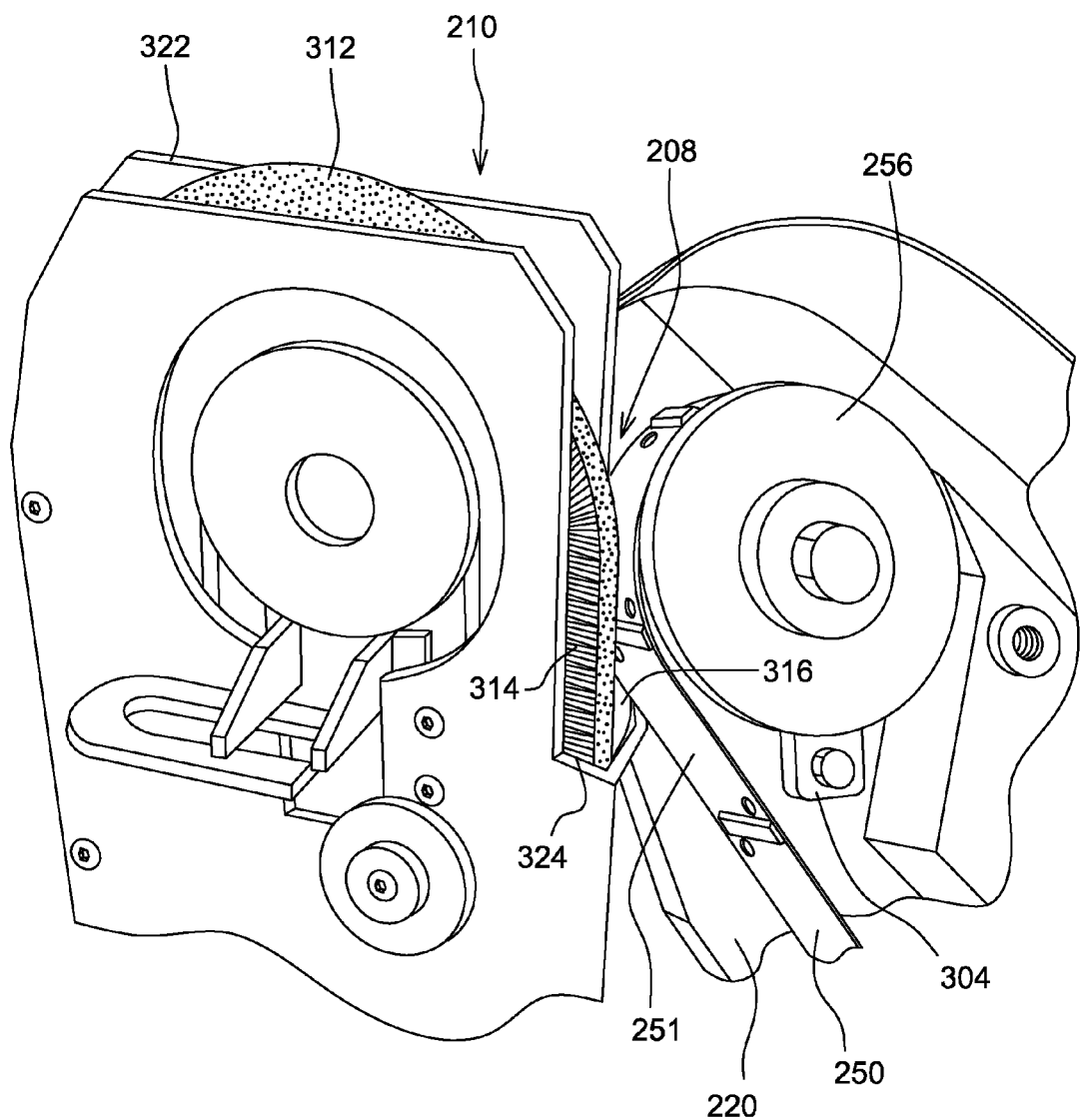
FIG. 20 is a perspective view showing the seed meter of FIG. 13 in relation to a seed deliver system.

The housing cover 278 mounts to the manifold and covers the open side of the housing 276 as shown in FIG. 19. A doubles the eliminator 310 is mounted to the housing cover and, when assembled, lies on top of the belt 250. The doubles eliminator 310 is roughly wedge-shaped and progressively increases in width in the travel direction of the belt to increase its coverage over the apertures 252. The doubles eliminated 310 causes doubles or multiples of seed to be removed from the belt resulting in a single seed covering each aperture 252.

In operation, as the belt rotates, the confronting faces 255 engage and agitate seed in the seed pool at the bottom of the housing 276. Seed from the seed pool will be adhered to the belt at each aperture 252 due to the vacuum applied to the apertures from the interior of the manifold 262 or by positive air pressure on the seed side of the belt. By virtue of the main slot 270, the seeds will continue to be retained on the belt as the belt travels from the seed pick-up region 206 to the idler pulley 256. Due to the groove in the idler pulley, the vacuum is maintained on the apertures as the belt travels around the pulley until the seed and the aperture reaches the tine 306 of the fork 304. Upon reaching the tine 306, the vacuum is terminated and the seed is released from the belt 250. Alternatively, the seed can be mechanically removed from the belt or removed by a combination of vacuum termination and mechanical removal or the seeds can be removed mechanically while the vacuum is still applied.

The second row of apertures 258 will also operate to retain a seed therein while the aperture 258 travels over the shorter slot 272. By picking up seed, the apertures 258 act to further agitate the seed pool. In addition, when the apertures 258 reach the downstream end 273 of the secondary slot 272, the seed is released from the belt. The release location from the aperture 258 causes the seed to pass over one of the apertures 252 as the seed falls. If the aperture 252 failed to pick-up a seed and is empty, the falling seed may be retained thereon. If the aperture 252 is not empty, but instead picked-up multiple seeds, the falling seed may collide with the multiple seeds and assist in removing one or more of the multiple seeds. In this fashion, the falling seed operates to avoid errors in terms either no seed or multiple seeds on an aperture 252.

At the seed release location 208, the seed is transferred from the metering belt 252 to the seed delivery system 210. The seed delivery system 210 is more fully described in co-pending application Ser. No. 12/364,010 filed Feb. 2, 2009 and incorporated herein by reference. The seed delivery system 210 includes an endless member also wrapped around pulleys and contained within a housing 322. The housing has an upper opening 324 through which seed is admitted into the delivery system. The endless member is shown in the form of a belt brush 312 having bristles 314 that sweep across the face 251 of the belt 250 to remove the seed therefrom. At the seed release location 208, a transition plate 316 is positioned adjacent the belt 250. The transition plate has a curved first edge 318 abutting the edge of the belt as the belt travels around the idler pulley. The belt brush bristles will engage a seed in the aperture 252A at the location shown in FIG. 19 and will sweep the seed off the belt and across the face 320 of the transition plate 316 in the direction of the arrow 321. The confronting face 255 behind the aperture 252A serves as a back stop to prevent the brush from knocking the seed off the metering belt. The confronting face 255 pushes the seed into the brush bristles. The downward extending tab portion 323 of the transition plate projects into the housing of the delivery system 210 to allow the brush to continuously trap seed as the seed moves off the belt 250, over the transition plate 316 and into the interior of the delivery system housing where the seed is trapped by the brush bristles and the interior surface of the delivery system housing 322. A guide 325 projects from the surface of the transition plate to guide the seed and keep the seed from being swept off the meter belt prematurely.

Figure 13:
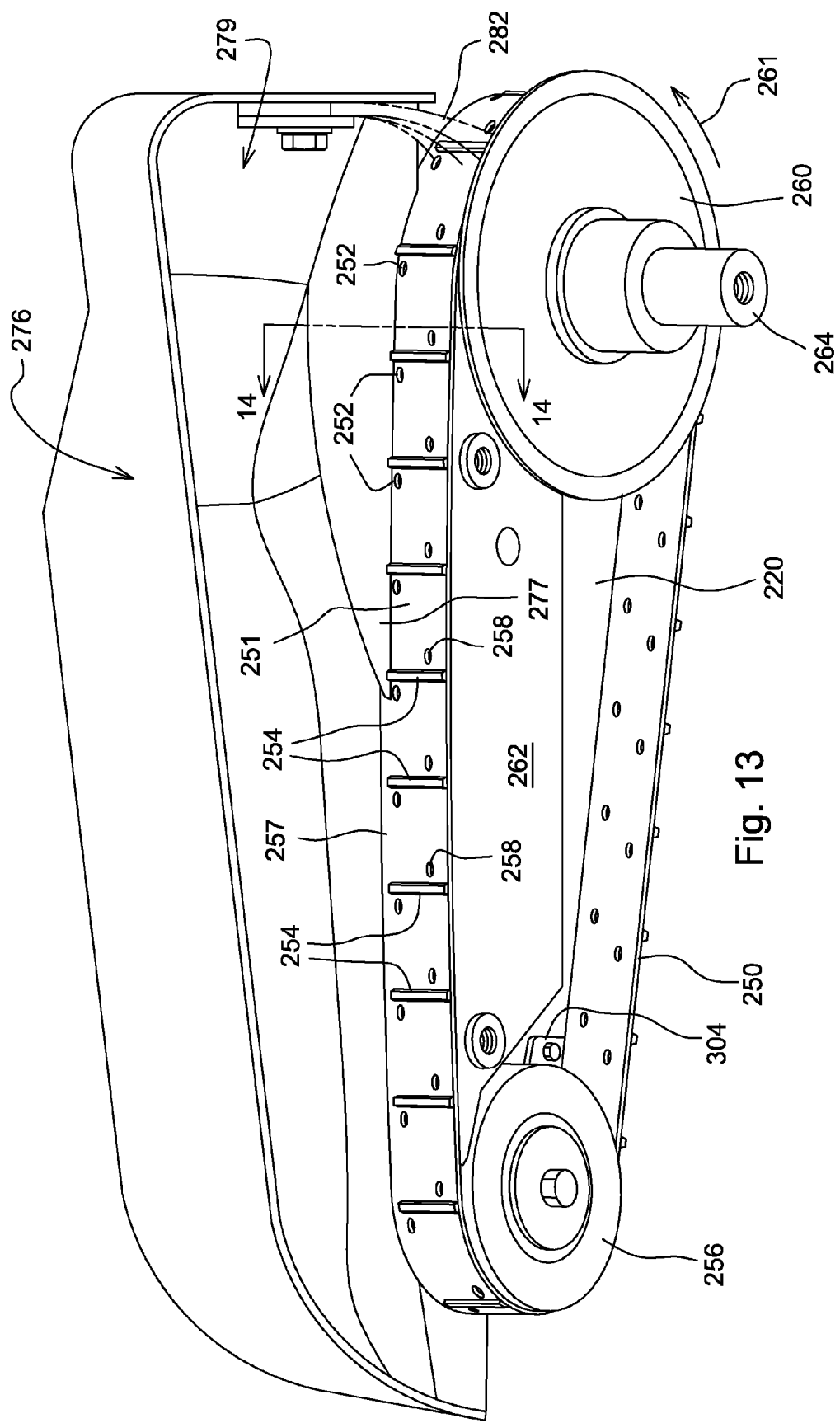
FIG. 13 is a perspective view of the seed meter of FIG. 12 partial disassembled.
Figure 14:
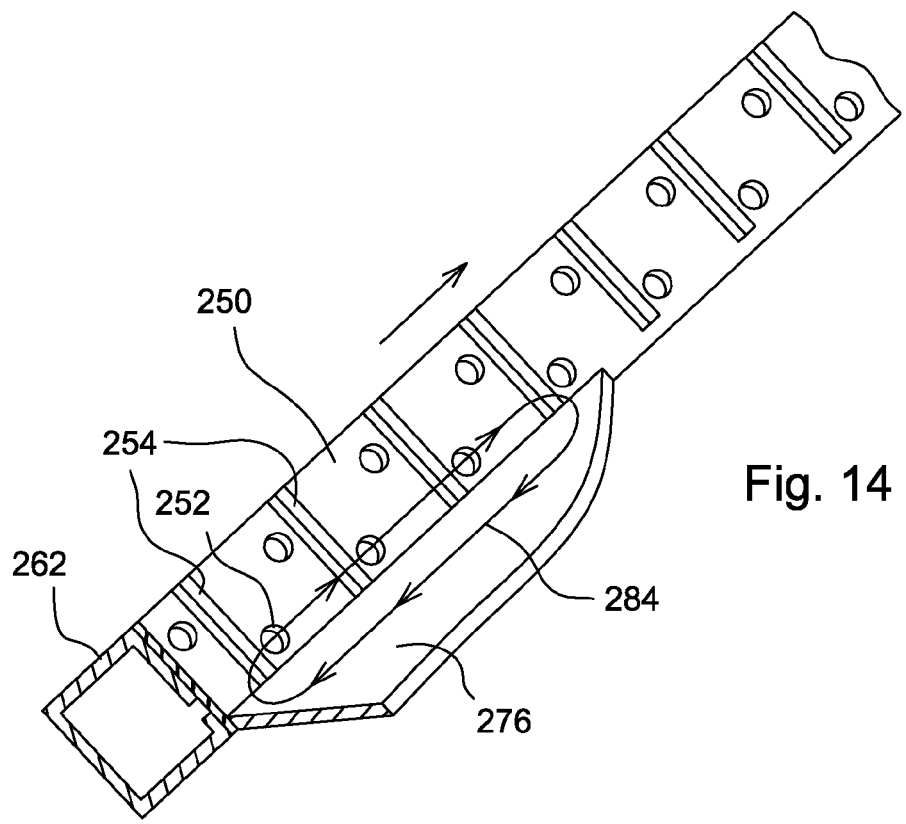
FIG. 14 is perspective view of the seed meter as seen along the line 14-14 of FIG. 13.
Figure 15:
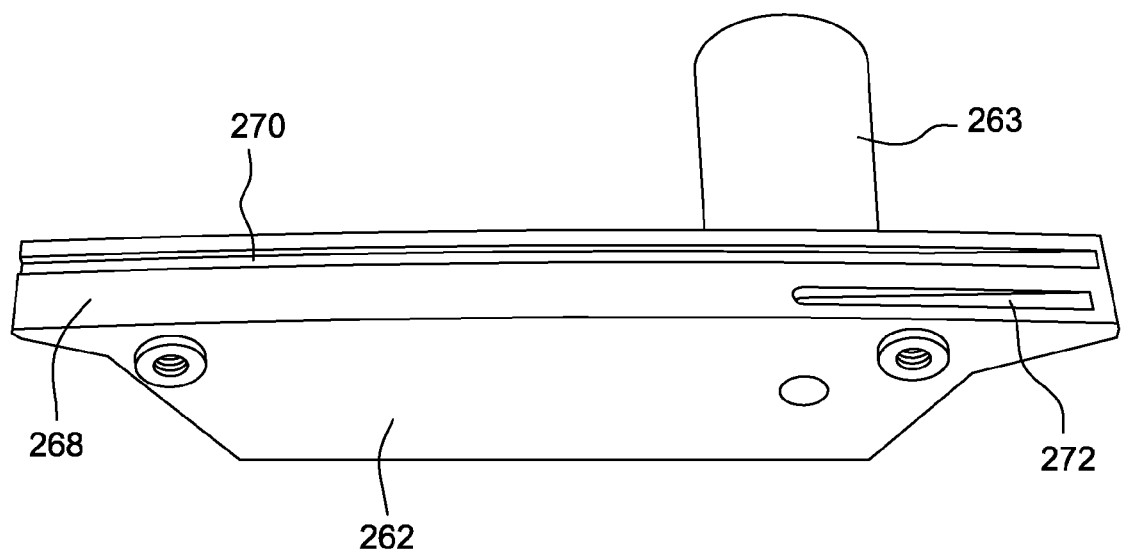
FIG. 15 is a perspective view of the vacuum manifold of the seed meter of FIG. 13.

As shown in FIG. 13, the belt 250 has the seed side on the radially outer surface of the belt with the vacuum manifold on the radially inner surface of the belt. The meter can be configured in an opposite manner with the seeds side being the radially inner surface of the belt and the vacuum manifold on the outer surface of the belt. Such an embodiment is shown in connection with FIG. 21 with some components removed for purposes of clarity. Seed meter 340 includes a support member 342 mounted to the row unit frame by a bracket 344. A motor 346 is drivingly coupled to a drive pulley 348. Idler pulleys 350 and 352 are also carried by the support member 342. A metering belt 360 is wrapped around the pulleys with a seed side 362 facing radially inwardly. Apertures 364 extend through the belt as described previously. Features 366 each forming a confronting face 368 provided immediately behind the apertures 364 in the travel direction 370 of the belt. Housing 372 is in communication with a seed source and holds a pool of seed at its lower end 374. The belt 360 passes the seed pool in a similar arrangement as shown in FIGS. 13 and 14. Covering the radially outer surface 376 of the belt over a portion of the belt path is a vacuum manifold 378. As described above with manifold 262, the manifold 378 includes a slot (not shown) aligned with the apertures 364. The manifold 378 is connected to a vacuum pump to create a lower pressure within the manifold. The lower pressure in the manifold draws air through the apertures 364 in the belt causing the seeds to adhere to the belt. Seeds are adhered to the belt in a seed pickup region at the lower end 374 of the housing 372 and travel with the belt to a seed release region 380. The idler pulley 350 years slotted to provide clearance for the seed on the belt. At the release region 380, the brush belt 312 of a seed delivery system 210 sweeps the seed off the metering belt 360 and delivers the seed to the furrow in the soil as described previously. The confronting faces 368 of the features 366 again assist in pushing the seed into the brush belt 312.

While the meter 340 as shown and described utilizes a low pressure or vacuum manifold to adhere to the seeds to the belt, the manifold 378 can be replaced with a supporting panel having a slot there in and the housing 372 pressurized to provide a positive air pressure to hold the seed to the belt 360.

The seed meter of the present invention, with a flexible belt as a seed metering and seed transport member enables the orientation of the member to varying along the belt path to optimize various functions of the member at different locations. The belt surface need not be vertical in the seed pick-up region as it is in a flat disk. Instead, the belt can be inclined, creating a less than vertical up-hill path for the seed at pick-up. Likewise, at the seed release, if dropped into a seed tube, the release orientation can be a reverse incline, or overhang, so that the belt moves away from the seed as the seed falls vertically. Alternatively, when the meter is used in conjunction with a seed delivery system, at the hand-off of the seed from the meter to the delivery system, the orientation of the metering belt relative to the delivery system can also be optimized.

Having described the preferred embodiment, it will become apparent that various modifications can be made without departing from the scope of the invention as defined in the accompanying claims.

The invention claimed is:

1. A row unit for a seeding machine comprising:
a seed meter having a metering member having apertures formed therein, means for moving the metering member such that the apertures move along a defined path having a seed pick-up region and a seed release region and means for creating a pressure differential on opposite sides of the metering member along at least the portion of the path between the seed pick-up region and the seed release region to adhere and retain seed on the metering member at the apertures; and
a seed delivery system receiving seed from the metering member, the seed delivery system having an endless member contained within a housing, the housing having an upper opening through which seed is received from the seed meter with the endless member entrapping the seed between the housing and the endless member wherein the endless member of the seed delivery system sweeps across the metering member to remove seed from the metering member.

2. A row unit for a seeding machine comprising:
a seed meter having a metering member having apertures formed therein, means for moving the metering member such that the apertures move along a defined path having a seed pick-up region and a seed release region and means for creating a pressure differential on opposite sides of the metering member along at least the portion of the path between the seed pick-up region and the seed release region to adhere and retain seed on the metering member at the apertures;
a seed delivery system receiving seed from the metering member, the seed delivery system having an endless member contained within a housing, the housing having an upper opening through which seed is received from the seed meter with the endless member entrapping the seed between the housing and the endless member; and
a transition member adjacent the metering member and extending between the metering member and the housing of the seed delivery system, the transition member having a surface over which the endless member of the seed delivery system moves the seed from the metering member in to the housing.

3. A row unit for a seeding machine comprising:
a seed meter having a metering member having apertures formed therein, means for moving the metering member such that the apertures move along a defined path having a seed pick-up region and a seed release region and means for creating a pressure differential on opposite sides of the metering member along at least the portion of the path between the seed pick-up region and the seed release region to adhere and retain seed on the metering member at the apertures; and
a seed delivery system receiving seed from the metering member, the seed delivery system having an endless member contained within a housing, the housing having an upper opening through which seed is received from the seed meter with the endless member entrapping the seed between the housing and the endless member wherein the endless member of the seed delivery system is a brush belt having bristles to entrap the seed and which bristles move over the surface of the metering member.

4. A row unit for a seeding machine comprising:
a seed meter having a metering member having apertures formed therein, means for moving the metering member such that the apertures move along a defined path having a seed pick-up region and a seed release region and means for creating a pressure differential on opposite sides of the metering member along at least the portion of the path between the seed pick-up region and the seed release region to adhere and retain seed on the metering member at the apertures; and
a seed delivery system receiving seed from the metering member, the seed delivery system having an endless member contained within a housing, the housing having an upper opening through which seed is received from the seed meter with the endless member entrapping the seed between the housing and the endless member wherein the metering member has a feature following each aperture along the defined path forming a confronting face to push seed on the aperture into the endless member of the seed delivery system.

* * * * *